US006569329B1

(12) United States Patent
Nohren, Jr.

(10) Patent No.: US 6,569,329 B1
(45) Date of Patent: *May 27, 2003

(54) PERSONAL WATER FILTER BOTTLE SYSTEM

(75) Inventor: John E. Nohren, Jr., Clearwater, FL (US)

(73) Assignee: Innova Pure Water Inc., Clearwater, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/566,384

(22) Filed: May 8, 2000

Related U.S. Application Data

(60) Provisional application No. 60/182,911, filed on Feb. 16, 2000, provisional application No. 60/133,855, filed on May 12, 1999, and provisional application No. 60/132,808, filed on May 6, 1999.

(51) Int. Cl.$^7$ .......................... B01D 25/02; B01D 35/28
(52) U.S. Cl. ...................... 210/282; 210/315; 210/316; 210/317; 210/338; 210/342; 210/467; 210/468; 210/489; 210/497.01; 210/502.1; 210/503; 210/505; 210/510.1
(58) Field of Search .................... 210/266, 282, 210/287, 488–489, 490, 497.01, 502.1, 503, 466–467, 469, 315, 316, 337, 232, 238, 472, 473, 418, 244, 245, 338, 429, 342, 117, 311, 317, 335, 483, 505–508, 510.1; 222/189.06–189.08

(56) References Cited

U.S. PATENT DOCUMENTS

| 4,105,561 A | * | 8/1978 | Domnick | 210/232 |
| 4,540,489 A | * | 9/1985 | Barnard | 210/287 |
| 4,617,118 A | * | 10/1986 | Smart | 210/232 |
| 5,211,973 A | | 5/1993 | Nohren, Jr. | |
| 5,431,813 A | * | 7/1995 | Daniels | 210/282 |
| 5,545,315 A | * | 8/1996 | Lonneman | 210/120 |
| 5,609,759 A | | 3/1997 | Nohren et al. | |
| 5,681,463 A | * | 10/1997 | Shimizu et al. | 210/266 |
| 5,919,365 A | * | 7/1999 | Collette | 210/419 |
| 5,928,512 A | * | 7/1999 | Hatch et al. | 210/266 |
| 6,004,460 A | | 12/1999 | Palmer et al. | |
| 6,136,189 A | * | 10/2000 | Smith et al. | 210/266 |
| 6,153,096 A | * | 11/2000 | Nohren, Jr. | 210/238 |
| 6,193,886 B1 | * | 2/2001 | Nohren, Jr. | 210/282 |
| 6,200,471 B1 | * | 3/2001 | Nohren, Jr. | 210/184 |
| 6,221,416 B1 | * | 4/2001 | Nohren, Jr. | |

FOREIGN PATENT DOCUMENTS

| WO | WO 99/04667 | 2/1999 |
| WO | WO 99/36152 | 7/1999 |
| WO | WO 00/09448 | 2/2000 |

* cited by examiner

Primary Examiner—W. L. Walker
Assistant Examiner—Marianne Ocampo
(74) Attorney, Agent, or Firm—Nixon & Vanderhye P.C.

(57) ABSTRACT

A bottle mountable filtration system typically includes a plurality of different filter elements or filtering and treatment elements having a substantially common central axis that are mounted to extend into a bottle from a cap with a manual valve. Mounting structures may be provided, by screw threads, or by an interference fit, and connect the filter treating elements to the cap. An outer filter treating element may comprise a chlorine removal primarily radial flow outer filter, and an inner treatment element comprising a flavoring, vitamin, mineral, or medication adding component including a mixing chamber which provides an axial flow chamber radially surrounded by the flavoring, etc., adding component. Conversely, the inner treatment element may be a radial flow carbon composite filter used independently or in conjunction with one of several independent outer water treatment elements which may be radial or axial flow in design for the removal of a variety of biological, organic, or inorganic contaminants.

23 Claims, 12 Drawing Sheets

PERSONAL WATER FILTER BOTTLE SYSTEM

CROSS REFERENCE TO RELATED APPLICATIONS

This application claims the benefit of U.S. Provisional Applications Nos. 60/132,808 filed May 6, 1999; 60/133,855 filed May 12, 1999; and 60/182,911 filed Feb. 16, 2000, the entire content of which is hereby incorporated by reference in this application.

BACKGROUND AND SUMMARY OF THE INVENTION

As the public both domestically and internationally has become aware of the decline in water quality due to both chemical and biological contamination, it has become apparent that more choice, capability, and versatility would serve the general public's interest. To provide the ability to the consumer to custom tailor a high performance water filtration product both simply and economically would be advantageous. Particularly as no such product currently exists. It has also become apparent that a significant quantity of water consumed by the public is consumed outside the home. Typically, prior to the introduction of portable personal water filter bottles by Innova Pure Water, Inc., the alternative was expensive, and not always conveniently available bottled water. This changed somewhat with the introduction of the portable Innova personal water filter bottles for chlorine, taste and odor removal. But a void has remained for lead, protozoa, nitrates, bacteria, viruses, and in some areas calcium.

By separating the various filtration elements into independent rechargeable filtration or water treatment components which are interchangeable, total flexibility and utility can be attained. As will be shown by the drawings and the product descriptions attached, there are independent interchangeable filtration/water treatment modules to solve most, if not all, principal water contamination problems. The essential breakthrough to providing such a system was to develop a universal filtration element functioning as the core element about which the specialized modules would be assembled and a convenient, efficient and secure means to assemble the components to preferably the bottle cap. By separating the individual filtration/water treatment components economic advantages, as well as flexibility is achieved. Thus, the user can purchase a high performance "Sport Type" bottle with greater than 90% chlorine, lead, taste and odor removal for use as a personal portable water treatment device to take along and replenish from typical municipal treated sources. However, with the addition of secondary filters, as an example, water may be taken from other sources of unknown quality and treated for biological contamination, or other desirable treatments may be achieved.

While the internal filter generally remains constant the outer elements are changed as dictated by the treatment requirements. The method of mounting and securing the filters is unique. Each of the bottle tops, which as presently used are of 53 mm–73 mm neck diameter, provide adequate clearance and space for the external secondary treatment device. This adaptation mechanism provides two independent surfaces upon which each of the treatment elements may be assembled. Typically, the outer element is affixed to the cap either with or through the use of a friction fit and double "O" ring seals, or a thread-on adapter. An advantage is in the secure, as well as simple nature of assembly which does not require any high degree of force. It is more positive, providing excellent filter retention and sealing capability, while remaining user friendly when considering the broad range of users. With the threaded design little strength is required to either assemble or remove the filter. Thus, the following described system for water treatment/filtration brings unique advantages of economics, safety, aesthetic water quality, and freedom from many harmful biological, chemical and heavy metal contaminants.

There are several significant aspects to the invention; the first is the manner by which two independent water treatment elements are combined. The second is the individual filtration/treatment modules which are freely combined with the basic unit. A third is the option of a proper and thoroughly mixed addition of vitamin, minerals, flavorings, or the like to the filtered water. As the various water treatment units are independent, and interchangeable to meet particular requirements a treatment system has been created for the first time. The system allows the user to adapt a basic high performance filter water bottle to a biological treatment product for protozoa, a product to devitalize or exclude bacteria, or bacteria and virus. Also, secondary treatment elements for the removal of nitrates, arsenic, calcium, and specific heavy metals, as well as contaminants which are radioactive and nuclear by-products.

The secondary filter assembles over the inner filter without affecting the inner carbon composite filter in any manner. The exceptional removal ability of the carbon composite filter removes not only chlorine very effectively, up to about 91%, but also removes the residual iodine taste which is frequently a by-product of treatment for the devitalization of bacteria and virus using an iodinated ion-exchange resin. The carbon composite filter will also remove up to about 97% of the lead present at a flow rate of 10 ml/sec. Another adjunct the subject system makes available is to add a cooling element containing a product such as the "blue ice"™ produced by Rubbermaid as the outer treatment unit which is removable to place in a freezer. After dropping to 32° F. or lower, the cooling element is reassembled to the bottle top over the standard internal carbon composite filter. The cooling element drops the water in the bottle approximately 15° below ambient for a period of an hour or more. The chilled water is consequently filtered by the inner carbon composite filter. The "Blue Ice"™ cooling element may also be used alone, without the inner filter, to cool beverages that should not be filtered; i.e., milk, juices, soft drinks, etc.

The system permits the use of multiple elements and the ease of removal and reassembly permits the practical regeneration of filters with reduced capacity, such as nitrate specific filters. As a result of the high levels of nitrate contamination found in certain locals in the U.S. and Europe a personal portable water filter bottle filter may only last through one day's use. It is then removed and placed in a regeneration unit which over time; i.e. overnight, regenerates the filter which is now ready for effective use. This procedure may be replicated over and over providing an extended life to the regenerative filter which could approach one year, or more.

While a number of designs can be conceived for the regeneration of the nitrate specific ion exchange resin, the essence of such a design for everyday consumer use would hold the filter to be regenerated in a vertical plane with a reservoir both above and below the filter to be regenerated. A solution of salt (sodium chloride) mixed with water to form a brine (approximately 5%–15% by weight). Each of the two reservoirs (above and below) contains exit/entry ports for the exchange of the brine solution through the ion-exchange resin within the filter body. The top reservoir and bottom reservoirs are reversed either manually or automatically through a spring return released by a latch timer, or other such simple mechanism. By rotating the unit half way through the complete cycle a higher efficiency is achieved. The regeneration unit is also designed to place the entry end of the filter at the base for the initial regeneration cycle. The inlet/outlet ports are sized to restrict the flow through the filter during the regeneration cycle to achieve optimum time in contact of brine with resin to permit the exchange function to take place. There is a second series of inlet/outlet ports sized to allow free unrestricted flow of rinse water through the reservoirs and centered filter. The choice of the port sizes is controlled by rotating the securing collar to one of two positions; i.e., regenerate or rinse.

In function the lower reservoir is filled with salt and water, the brine, and assembled to the filter adapter, with filter, and the upper reservoir. The unit is placed into its stand and the reservoirs and filter assembly is rotated 180 degrees, bringing the reservoir with the brine to the top. As a function of the 180 degree rotation, a spring and timer are set which will again rotate the reservoirs and filter assembly back 180 degrees, timed to coincide with the brine having transferred from the top to the bottom reservoir through the filter.

Upon completion of the regeneration phase the reservoirs with filter assembly are removed from the stand and the threaded end cap of brine filled reservoir is removed and the brine emptied, typically into a sink. The end cap of the other empty reservoir is then removed and with the filter adapter rotated to access the rinse ports, the assembly is placed into the sink and fresh water allowed to run through to rinse the brine from the filter. This operation can also be unattended, as is the regeneration cycle. The rinse cycle requires just a few minutes to clear the remaining brine.

Alternatively a simple nitrate regeneration fixture may be used, for practicing the following: (a) Providing a fixture having a salt support element with a porous bottom portion. (b) Placing salt in the salt support element. (c) Passing water from a faucet or hose into the salt support element to dissolve the salt and produce a brine solution. (d) Causing the brine solution to flow through the porous bottom and through a nitrate filter in need of regeneration. And, (e) after all salt has been dissolved, continuing the passage of water from the faucet or hose through the filter until the regenerated filter is ready for use.

Still another opportunity exists with the use of independent filter or treatment modules. The inner module can contain nutrients to act as supplements, including vitamins and minerals, which are released in dissolved form and more easily ingested than in pill form. Secondly, the inner treatment module may contain a flavoring module which may comprise or consist of a controlled low solubility flavored binder or a liquid flavor dispenser for dispensing materials as shown generally in International Published Application WO 00/09448, the disclosure of which is hereby incorporated by reference herein. The size of the inner module is such that a liquid flavor extract may be used with an incorporated dispenser which meters the flavor extract in a controlled manner based upon water flow and mixes the same. A similar system may also be used to dispense vitamins, minerals, and even medications.

Another uniqueness of products of the invention comes from its ability to achieve removal percentages far in excess of earlier products of a portable nature which were limited to the removal of chlorine, taste, and odor at a substantially reduced amount and rate of flow. The previous state of the art provided for the removal of at least 50% of the chlorine present, at a flow rate of 50 ml/sec., for approximately 30 gallons. These products were able to remove only a very small amount of lead, less than 50%, over a few liters of water. Even if desired, there was no practical way to integrate the ability of the earlier filters to eliminate protozoa cysts, from the water to any practical or assured degree while retaining a sufficiently low pressure drop in a sport type bottle where flow is driven by either squeezing or drawing a vacuum with the mouth, "sucking".

The need was recognized, first of all to remove chlorine which in many geographical areas can reach more than 4 ppm, and presents a potential health hazard. And secondly, the problem of lead contamination which earlier portable products failed to deal with at all. Lead from several sources has been found in a variety of water supplies, including many that are municipally treated. Lead is known to cause a significant reduction of mental acuity as well as being poisonous to the body in general.

The subject invention successfully eliminates the chlorine and lead problem through the development of a filtration media comprising coconut base activated carbon, a lead specific zeolite compound known as ATS, and an integrating polymer. The activated carbon may comprise about 60% of unit mass by weight, and the ATS material may comprise about 20% of the unit mass by weight. The integrating polymer may comprise about 20% of the unit mass by weight. (This formula may be modified by adjusting any of the individual components, some as much as 20–50%.) In their initial, pre-compounded state the components range from approximately 250 microns in size to below 37 microns, as well as a portion of fine dust. The individual median pore size (porosity), by design, averages about 15 microns, but may be as low as 2.0 and as high as 80 microns, and with no more than 2 psi pressure drop. At a flow rate of 10 ml/sec chlorine removal initially exceeds 90% and does not fall below 80% removal at 35 gallons. Similarly, the removal of lead approximates 97% initially and does not fall below 90% over 80 gallons. All tests are conducted in accordance with scientifically accepted protocol such as used by NSF under the auspices of the Environmental Protection Agency of the United States Government. The maximum pressure drop should be no more than 2 psi across the interface with slightly less than a 1 psi pressure differential, the design goal.

To be practical and efficient the composition of the above named elements should be formed into a monolithic block, of open center cylindrical form, with one closed end, the other end open permitting the ready flow of water from the center annulus. To achieve maximum surface area while controlling the wall thickness, pore size, and hence pressure drop, the flow of water through the monolithic filters' wall is radial, perpendicular to the central axis of the open center single closed end cylinder. For ease of use with a bottle or container, that is designed to be refilled, the entire water filter bottle assembly should preferably consist of no more than two pieces, one for each hand when filling the bottle. Thus, the filter is semi-permanently affixed to the base of the bottle cap. It is held in position by mechanical means which will also release the filter, without difficulty or undue effort, when the filter should be changed. Alternatively, a filter flange mount resting on the neck of the bottle and secured in place by the top may be used. However, when doing so it must be individually removed to fill the bottle. This means as it is separate from the bottle top that it must be handled and set down, or the top must be set down. Neither condition is attractive from a sanitary perspective.

To add a modification to the previously described product for the removal of protozoa cysts, a means has been devised by which an integrated microbe-fiber depth filter has the capability of eliminating 99.95%, or more, of the protozoa present in raw water when flowed through the filter at a flow or approximately 10 ml/sec., or more. A micro-fiber media such as manufactured by The Pall Company is suitable for this purpose. One such media is Pall Versa Pore No. 3000 W/WA which in tests has demonstrated the ability to reduce biological contaminants of 3 microns or more under a pressure of approximately 30 inches of water, or one atmosphere. The product is not limited to its functionality by the stated drop. However, to exceed 2 atmospheres would require undue exertion on the part of the user and would also limit the individuals who would find this higher pressure drop acceptable.

The manner by which the micro-fiber protozoa element is integrated with the above described monolithic filter is important. It is desirable that the outer surface of the micro-fiber be protected from unnecessary handling and external physical contact with the exception of the raw water. It is also desirable that the interior surface of the micro-fiber filter be similarly protected, particularly during the assembly of the carbon composite monolith element to preclude any distortion that could cause leakage. It is mandatory that the integration of the protozoa micro-fiber be done in a manner to eliminate the possibility of "by-pass". To accomplish this the micro-fiber element is molded and sealed within the filter containing housing.

Another advantage of this design is to maintain the same internal or external housing dimensions, which allows filters with the protozoa filtration capability to be interchanged with the chlorine—lead only category of filters without modification of any kind to the bottle cap mounting surfaces.

As a result of the capacity and size of the carbon composite filter it lends itself to integrate with a second and independent filter element which may be adapted to a bottle top or cap by means of a second mounting surface which may be a locking taper, "O" ring, or preferably a threaded hollow boss. Thus, a very high degree of flexibility can be achieved. The second outer filter may be designed to be of either a radial or axial flow nature. When of an axial flow nature a void area between the inner and outer filter acts as a reservoir, filling from the bottom when an axial flow filter is employed, permitting the water therein to transfer into the inner filter in a radial flow mode.

According to one aspect of the present invention there is provided a bottle mountable filtration system comprising: A cap dimensioned to fit on and close a neck or open end of a bottle, the cap having substantially opposite first and second surfaces. A manual valve extending outwardly from the first surface. A screw threaded tubular element extending outwardly from the second surface and substantially concentric with the manual valve. A passageway substantially concentric with the tubular element extending through the second surface to the valve to allow liquid to flow to the valve. A water filter or treating assembly comprising a plurality of different filter elements or filter and treating elements having a substantially common central axis. And a first mounting structure connected to the filter or treating assembly having screw threads compatible with the tubular element screw threads, and when connected to the tubular element positioning the filter or treating assembly so that liquid flows primarily radially to the central axis through at least one of the filter elements to the passageway.

Typically the tubular element is exteriorly threaded and the mounting structure is interiorly threaded, and the system further comprises an unthreaded tube substantially concentric with the tubular element and surrounded thereby; and a second mounting element connected to one of the filter or treating elements and cooperable with the unthreaded tube. A vent may be provided in the cap if desired.

In one preferred embodiment, the filter or treating elements comprise a combined chlorine removal element, and a lead removal element, capable of removing at least 80%, e.g. at least 90%, of the lead and at least 80% of the chlorine in tap water filtered thereby during a useful life of at least 35 gallons, and a flow rate of about 10 m/sec. For example, the chlorine removal element comprises a carbon block element that is at least about 30% carbon by weight, up to about 60% carbon by weight. The system may further comprise a first annular gasket mounted to the cap second surface and positioned to engage and form a seal with the first mounting structure; and a second annular gasket mounted in the first mounted structure and positioned to make a seal with the screw threaded tubular element when the screw threaded tubular element and the first mounting structure are screwed together.

In another embodiment the plurality of filter or treating elements comprises a first centrally positioned filter element comprising a carbon block element surrounded by a liquid pervious housing with a micro fiber sheet having a porosity of about 1–4 microns fixed to the housing and operatively engaging the carbon block. The carbon block may comprise about 40–80% activated carbon, a lead specific zeolite compound such as ATS in a range of about 10–40%, and an integrating polymer of about 10–40% of the unit mass by weight. Porosity is typically between about 10–80 microns.

A liquid impervious common bottom may be provided for the outer filter housing. Also, in another embodiment the plurality of filter or treating elements comprises a chlorine removal primarily radial flow outer filter, and an inner treatment element comprising a flavoring, vitamin, mineral, or medication adding component. For example, the system may further comprise a mixing chamber operatively mounted to the treatment element to mix at least one flavoring, vitamin, mineral, or medication with water treated by the outer filter. The mixing chamber (which may have an internal helix which causes a rotating or spiraling liquid flow to effect mixing) may be an axial flow chamber radially surrounded by the flavoring, vitamin, mineral, or medication adding component, and further comprising a moving plug which prevents formation of a detrimental vacuum as the flavoring, vitamin, mineral, or medical component is consumed.

Alternatively, the plurality of filter and water treatment elements comprise an exterior water cooling gel, and an inner primarily radial flow carbon block filter; for example, the gel includes an expansion absorber therein at top and bottom portions of the exterior treatment element. The plurality of filter or treatment elements may consist essentially of at least two different filter elements.

According to another aspect of the present invention there is provided: A bottle mountable filtration system comprising: A cap dimensioned to fit on and close a neck or open end of a bottle, the cap having substantially opposite first and second surfaces. A manual valve extending outwardly from the first surface. A tubular element extending outwardly from the second surface and substantially concentric with the manual valve. A passageway substantially concentric with the tubular element extending through the second surface to the valve to allow liquid to flow to the valve. A water filter or treating assembly comprising a plurality of different filter elements or filter and treating elements having a substantially common central axis. A first mounting structure connected to a first of the filter or treating elements and having an exterior surface making a friction fit with an inner surface of the tubular element. And a second mounting structure connected to a second of the filter or treating elements and having an interior surface making a friction fit with an outer surface of the tubular element.

The system may further comprise at least one O-ring seal between the second mounting structure interior surface and tubular element outer surface. The second mounting structure interior surface may also be threaded to correspond and engage the external threaded mount of the second filter assembly. Provision is made for a seal ring to be positioned at the base of both threads. The details of the components may be as described above. Also, one of the filter elements may be selected from the group consisting essentially of ceramic having a median pore diameter of less than one micron, nitrate specific ion exchange media, resin with a preference for calcium and magnesium carbonate, biological, and lead removal media.

According to another aspect of the present invention there is provided a method of regenerating a nitrate-contaminated nitrate specific water treating resin using an approximately 5–15% by weight solids brine solution, and fresh water, comprising: (a) Passing the brine solution through the nitrate-contaminated resin at a first rate to provide substantially optimum contact between the brine and nitrate-contaminated resin so as to regenerate the resin; and (b) rinsing the regenerated resin with the fresh water by passing the fresh water through the regenerated resin at a second rate, greater than the first rate, until the regenerated resin is ready for use.

According to yet another aspect of the present invention there is provided a bottle mountable filtration system comprising: A cap dimensioned to fit on and close a neck or open end of a bottle, the cap having substantially opposite first and second surfaces. A manual valve extending outwardly from the first surface. A passageway substantially concentric with the tubular element extending through the second surface to the valve to allow liquid to flow to the valve. A treatment element comprising a flavoring, vitamin, mineral, or medication adding component and including a mixing chamber operatively mounted to the treatment element to mix at least one flavoring, vitamin, mineral or medication with water passing therethrough, the mixing chamber comprising an axial flow chamber surrounded by the flavoring, vitamin, mineral, or medication adding component. And a first mounting structure connected to the treatment element and when connected to the treatment element positioning the treatment so that liquid flows through the mixing chamber when passing to the passageway to flow out the valve.

The system as described above may further comprise a mixing chamber comprising a moving plug which prevents formation of a detrimental vacuum as the flavoring, vitamin, mineral, or medication component is consumed. Alternatively, or in addition, the system may further provide a chlorine and other contaminant removal element disposed outwardly of the flavoring, vitamin, mineral, or medication adding component so that liquid flows substantially radially through the chlorine removal element before passing to the mixing chamber.

It is the primary object of the present invention to provide a versatile yet highly effective water treatment system and procedure that is mountable in a bottle. This and other objects of the invention will become clear from a detailed description of the invention and from the appended claims.

BRIEF DESCRIPTION OF THE DRAWINGS

FIG. 10b also shows the inclusion within the hollow center a bundle of hollow fiber biological filters of approximately 0.01 micron pore size; the bundle is sealed at the top providing a liquid impervious wall forcing all liquid to pass through a hollow fiber within the bundle in order to exit the system;

DETAILED DESCRIPTION OF THE DRAWINGS

Figure 1:
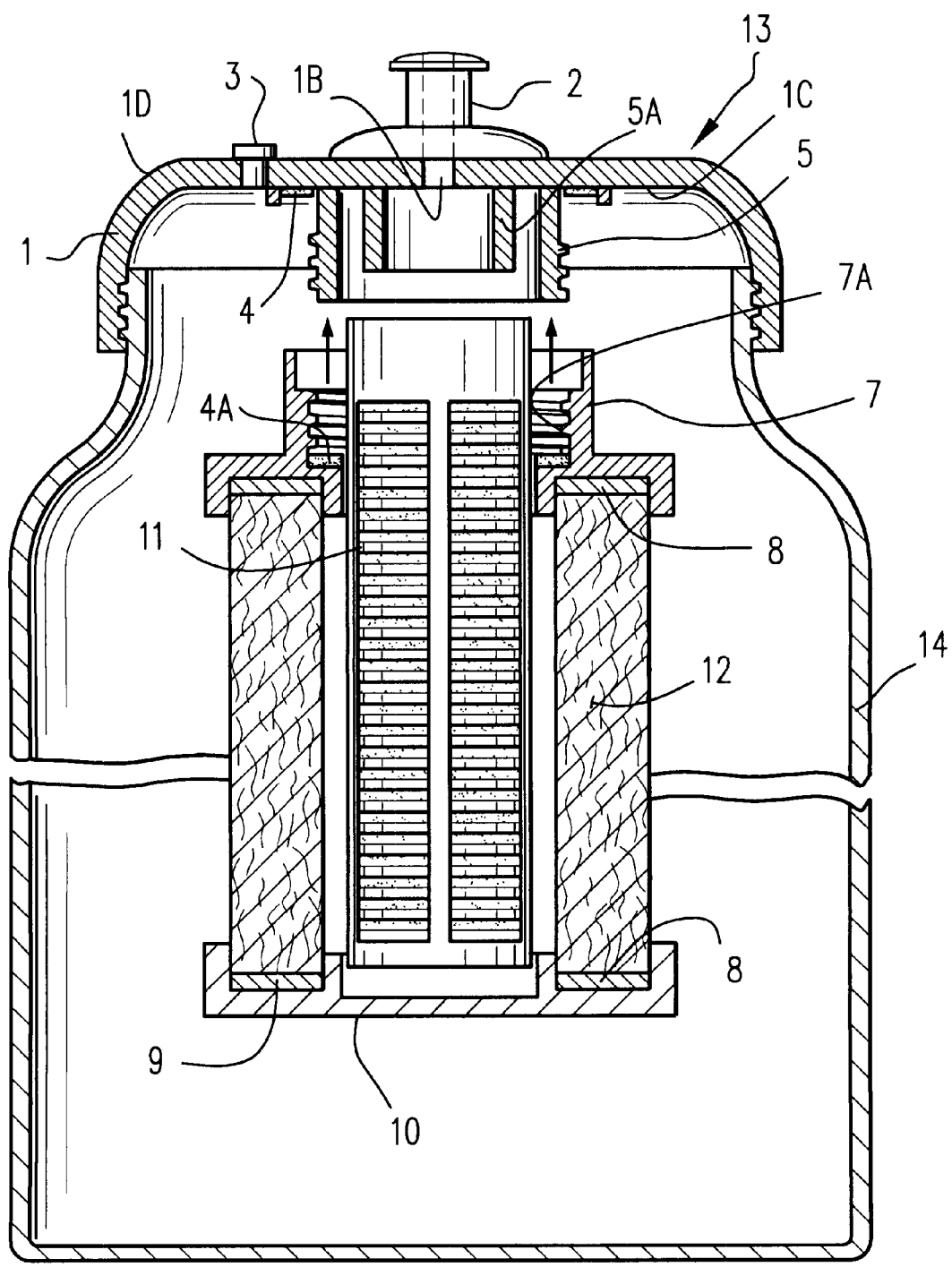
FIG. 1 is a side schematic view, partly in cross section, and partly in elevation, of one exemplary bottle mountable filtration system according to the present invention in exploded view, and in association with a bottle.

FIG. 1 shows one way of assembling two independent filter elements to a bottle top in a manner permitting each filter to compliment the other. This forms the basic element of the system approach where a variety of differing water filtering and/or treatment devices may be combined to suit a variety of requirements. In FIG. 1 the bottle top or cap 1 contains a manual valve 2, such as shown in U.S. Pat. No. 5,609,759, FIG. 7 of U.S. Pat. No. 5,273,649, and PCT publication WO99/36152 (the disclosures of which are hereby incorporated by reference herein), an optional conventional unidirectional air relief vent 3, and significantly two separate ring bosses 5, 5A, for filter or treatment device mounting. The cap 1 has an internal passageway 1B for liquid to pass from the inner surface 1C of cap 1 to the outer surface 1D thereof (i.e. through valve 2 when open).

The inner ring/tube boss 5A, typically mounts an inner treatment element 11, e.g. which may or may not be biological in nature, but incorporates a chlorine lead removal element in the form of a monolithic carbon filter element.

The outer externally threaded boss and housing mount 5, secures the outer treatment device 12 which may be biological in nature, or arsenic, nitrates, or any number of substances found in water which the user might choose to remove. Housing mount 5 mates and secures the upper filter adapter 7 in place. Being of a threaded design (that is inner threading 7A for the upper filter adapter 7 mounting structure) positioning is positive and permits effective sealing to take place with first and second sealing gaskets 4 and 4A. The independent inner radial flow filter 11, mounts to the external surface of the boss ring/tube 5A, although the design is such that it may be modified to permit mounting to the inner surface of ring/tube SA. The upper filter adapter 7, is generally universal and may be used with a variety of treatment elements. The base outer filter adapter or lower filter adapter 10, which may be substantially liquid impervious, is also generally universal and may be used with a variety of tubular treatment elements 12 which would generally be supported between the upper and lower filter adapters 7 and 10. The tubular treatment elements 12, as required, are sealed or potted at 8 and 9 to both the upper and lower filter adapters 7 and 10.

FIG. 1 shows the filter assembly 13 mounted in a bottle 14, such as a squeezable plastic bottle (sport bottle).

Figure 2:
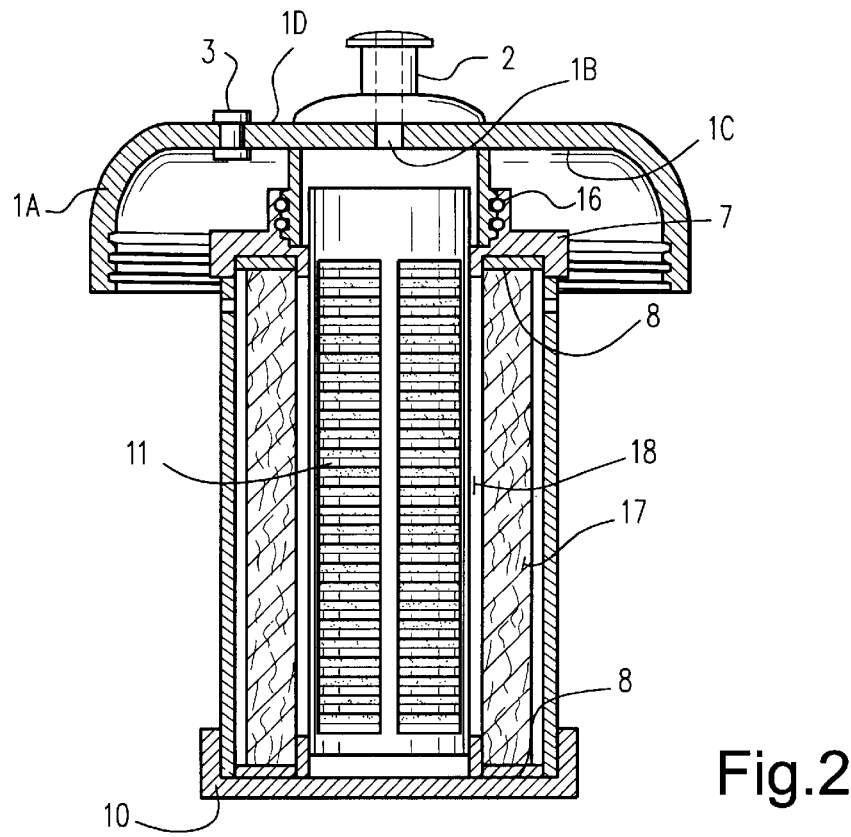
FIG. 2 is side schematic view, partly in cross section, and partly in elevation, of another embodiment of an exemplary bottle mountable filtration system according to the present invention.

FIG. 2 shows a bottle top 1A, which employs an optional connecting relationship using a single internal mounting ring boss top with double "O" rings 16 securing and providing a biological seal to the outer protozoa filter 17. The outer protozoa filter 17 may be of either a pleated or straight cylindrical design and comprises micro fibers assembled and bonded to produce a protozoa barrier material typically having 1.5–3 micron pores. The protozoa filter 17 is bonded to the upper and lower filter adapters 10 and 7, with a bonding or potting compound 8. The protozoa outer filter is separated by a void 18 into which water may accumulate for transfer through the independent inner radial flow filter 11.

Figure 3:
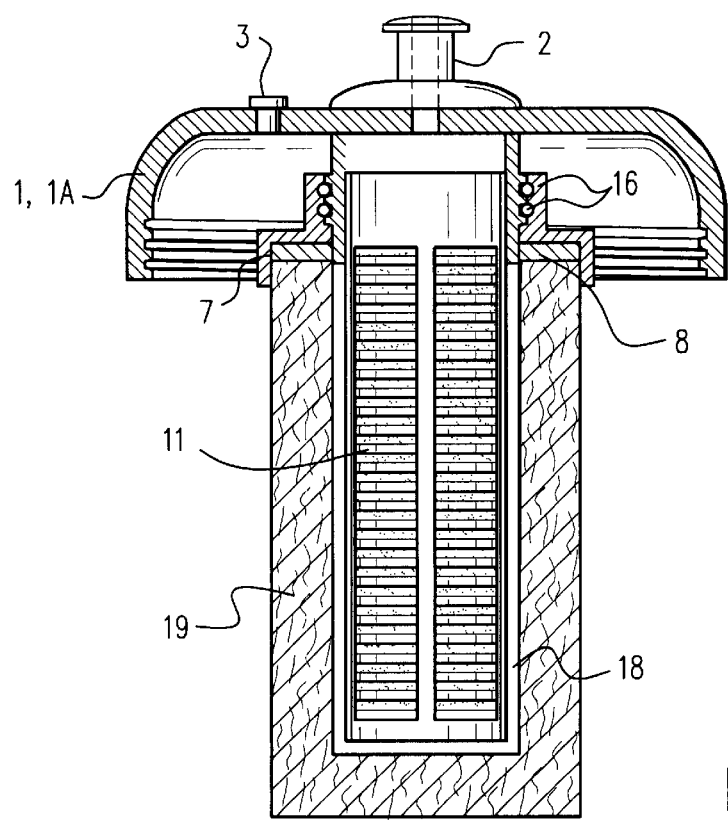
FIGS. 3 through 9 are views like those of FIG. 2 only each of a different embodiment of a bottle mountable filtration system according to the invention.

FIG. 3 shows the mounting of a ceramic outer filter 19, which exhibits sub-micron particle retention, i.e. less than 1 micron, typically about 0.03–0.05 microns. The filter element 19 may also be made of sub-micron fiber substrates such as may be found in modified reverse osmosis membranes. This provides a physical barrier to protozoa and most bacteria. The remaining elements are preferably as previously recited.

Figure 4:
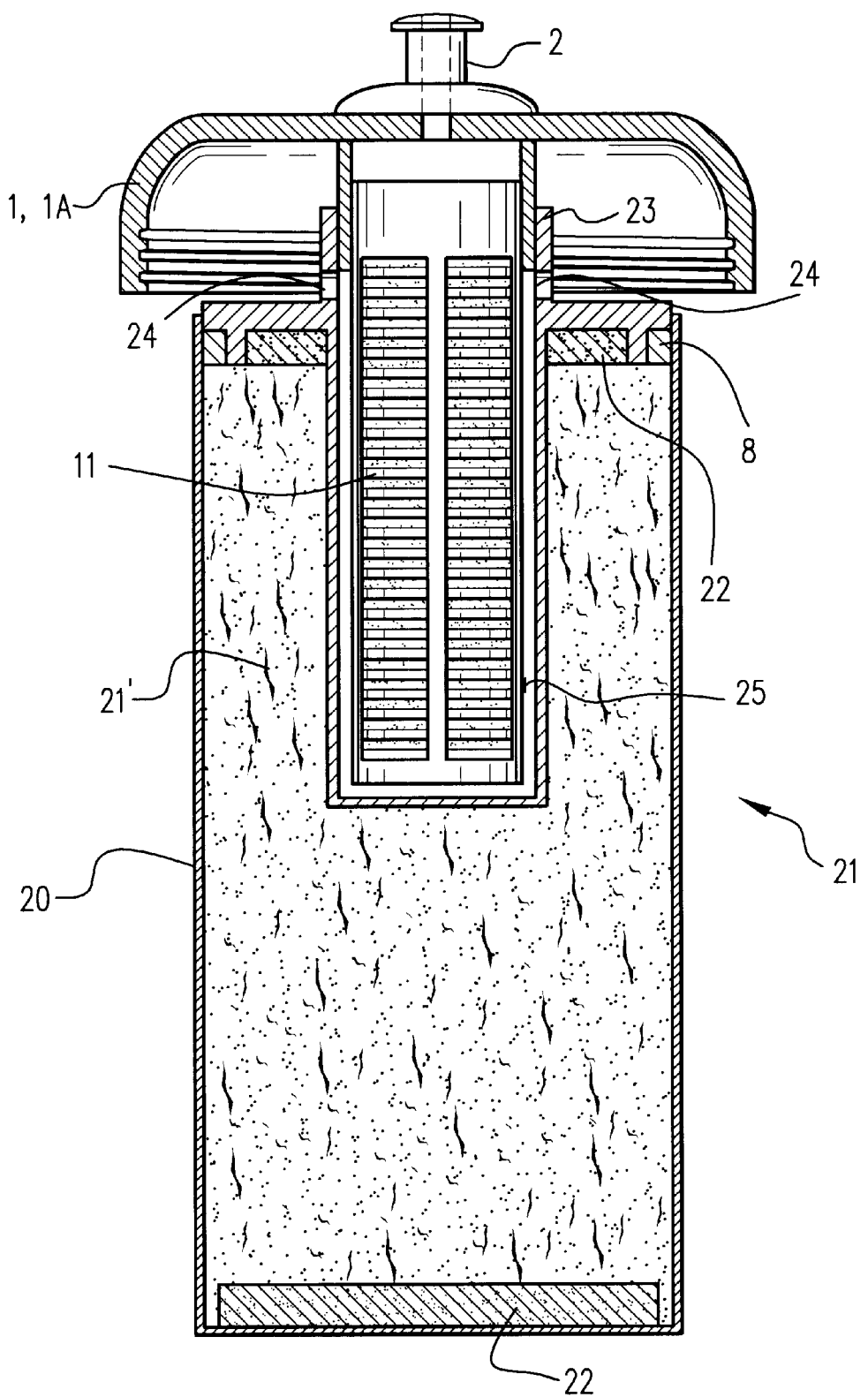

FIG. 4 exhibits a design for a water chilling or cooling element 21 comprising or consisting of an outer gel container 20, cooling gel 21', expansion absorbing cushions 22, and mounting adapter 23. Water access ports 24 permit water to enter the cooling chamber 25 between the cooling container assembly and independent inner radial flow filter 11. The water is chilled by both the cooling element 21 being submersed in the body of water in the bottle (e.g. 14) to which cap 1, 1A is attached, separated by element 20, and also as the water enters the cooling chamber 25 and fills the cooling chamber 25 from which it is drawn. The cooling element may typically be bonded (at 8), to the mounting adapter 23, or upper filter adapter 7.

Figure 5:
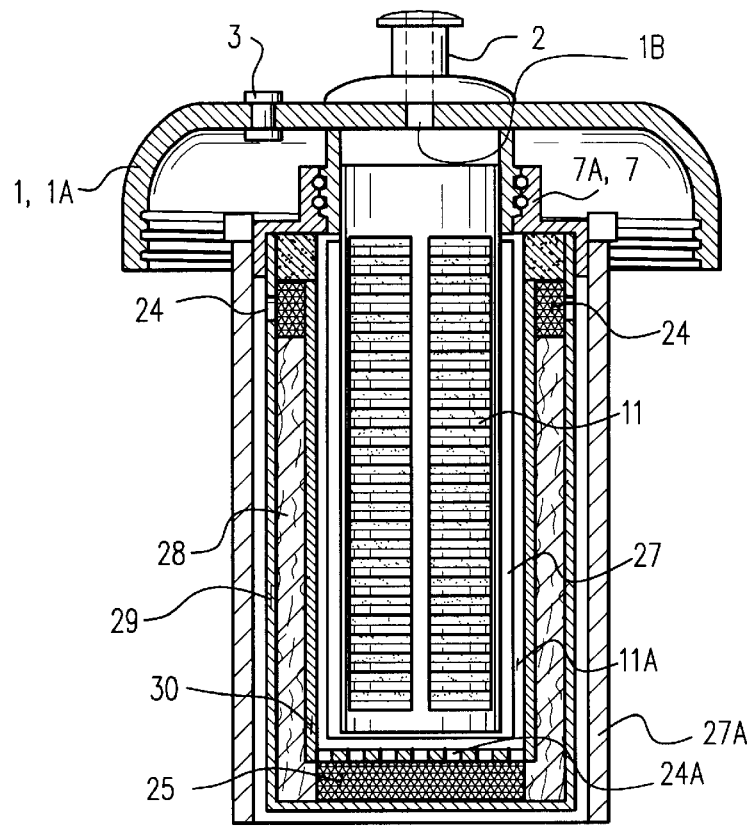

FIG. 5 schematically illustrates a design for maximum biological treatment by combining a micro porous filter element 27 with pores typically between 1–3 microns although pores as low as 0.5 microns may be employed in conjunction with this basic carbon composite filter 11. The optional pre-filter 27A is mounted to the upper filter adapter 7 which contains the outer filter body. The outer filter body is made up of an outer media support housing 29, an inner housing 30, and media 28. The media is typically granular iodinated resin, or similar substance and the flow is substantially axially through the filter bed 28. The inlet ports are positioned at the top of the outer housing 29 and the exit ports at the bottom of the inside housing 30, as shown by raw water entrance port 24 and treated water exit port 24A. The media is separated from the exit and entrance ports by media retention porous filter material 25. The previously treated water is accumulated in the distribution reservoir 11A, and hence travels radially through the walls of the inner micro porous filter element 27 and hence through adjacent composite filter 11. The fully treated water flows up a central void in filter 11 and exits out passageway 1B and valve 2.

Figure 6:
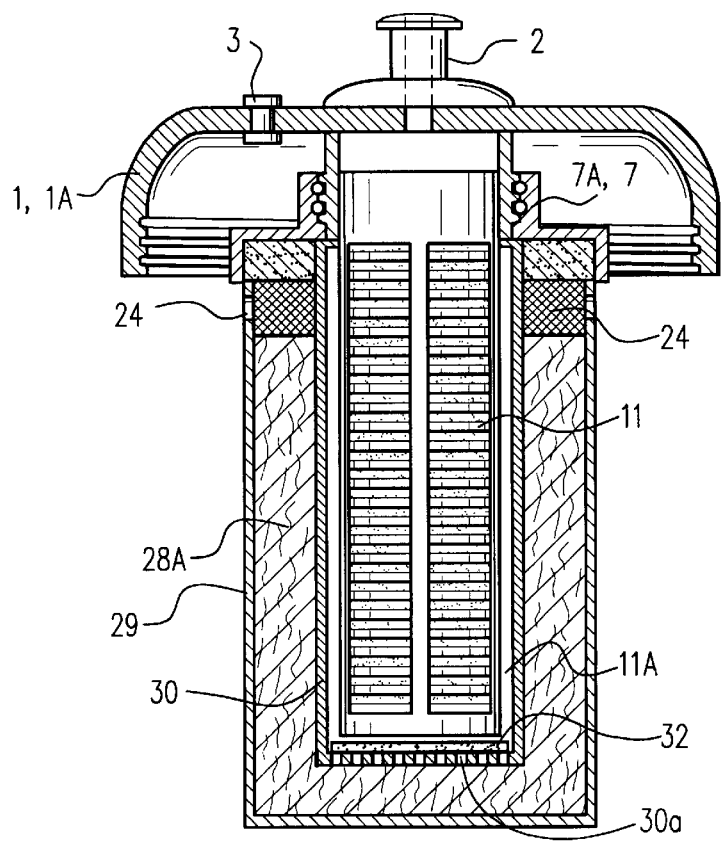

The embodiment of FIG. 6 is of a similar design to that of FIG. 5 but contains a nitrate specific resin such as Ionac SR-7, produced by Sybron Chemicals Inc. The uniqueness of the design permits the easy and quick removal of the nitrate specific filter contained in housing 29–30 with upper filter adapter 7. As the useful life of the nitrate specific resin 28A can be as low as 2–4 half-liter bottles, to be practical, the filter must be regenerated. The subject filter is regenerated in a simple brine washing system, and method, as described with regard to FIG. 18. A similar filter design can be used to remove calcium from the water where such is deemed detrimental such as in parts of the U.S. and Europe.

That is, the FIG. 6 embodiment combines an inner filter 11 which is mated and assembled to a bottle top 1, preferably containing a second outer threaded housing mount, as in FIG. 1, or a duplex mounting boss as shown in FIG. 6. The upper filter adapter 7 is assembled with the outer media support housing 29, and the inner media support housing 30 which is cup shaped and perforated at the base, containing the media 28. The assembly is completed using the sealing and potting compound 8 and contains media retention porous screens 25. The raw water enters through inlet ports 24 and flows axially through the granular media to exit ports 30a in the base of the inner housing 30. A porous media retention screen 32 is placed in the space between the inner face of the support housing 30 and the base of the inner filter 11. The water exiting from the outer axial flow filter enters the distribution reservoir through the porous media retention screen 32 and flows radially through the inner carbon composite filter 11 in to a central void for exiting from the system through valve 2 mounted in top 1 or 1A.

Figure 7:
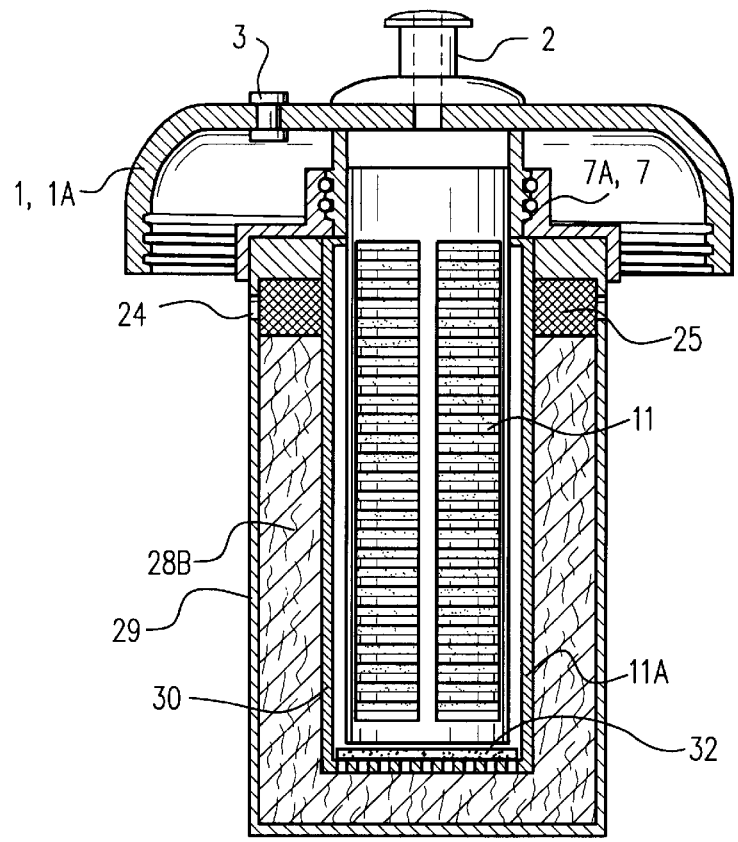

FIG. 7 shows a similar system to that of FIG. 6 but may be used to remove excess lime or calcium from the water. The nitrate specific ion exchange media 28A is replaced by a resin 28B with a preference to calcium and magnesium carbonate such as Ionac C-266 fine mesh cation resin.

Figure 8:
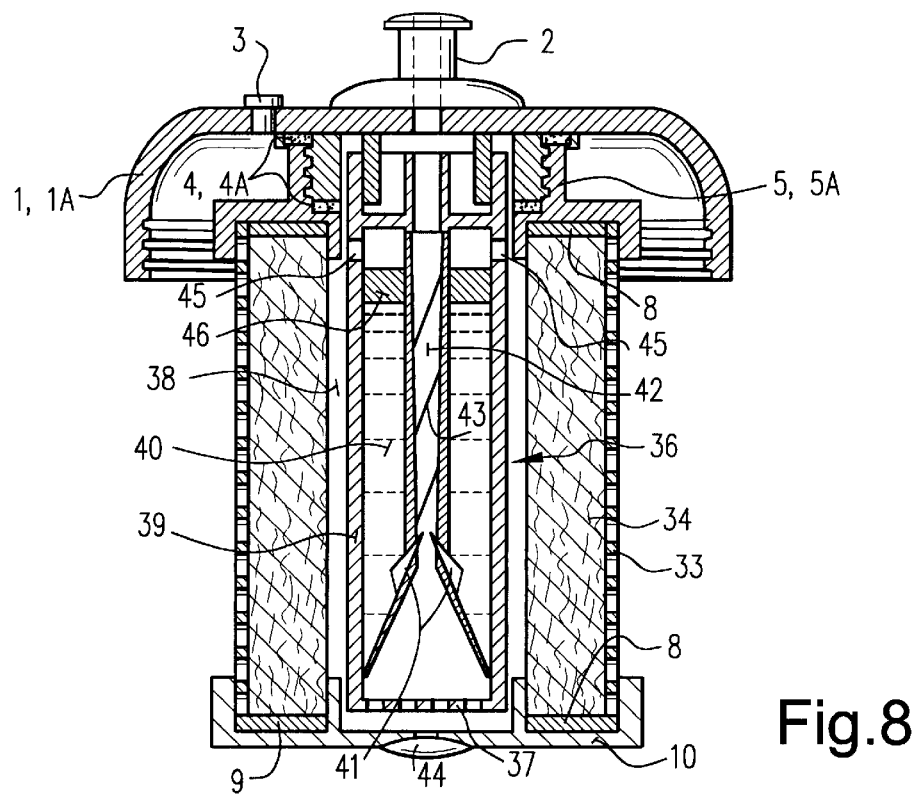
Figure 9:
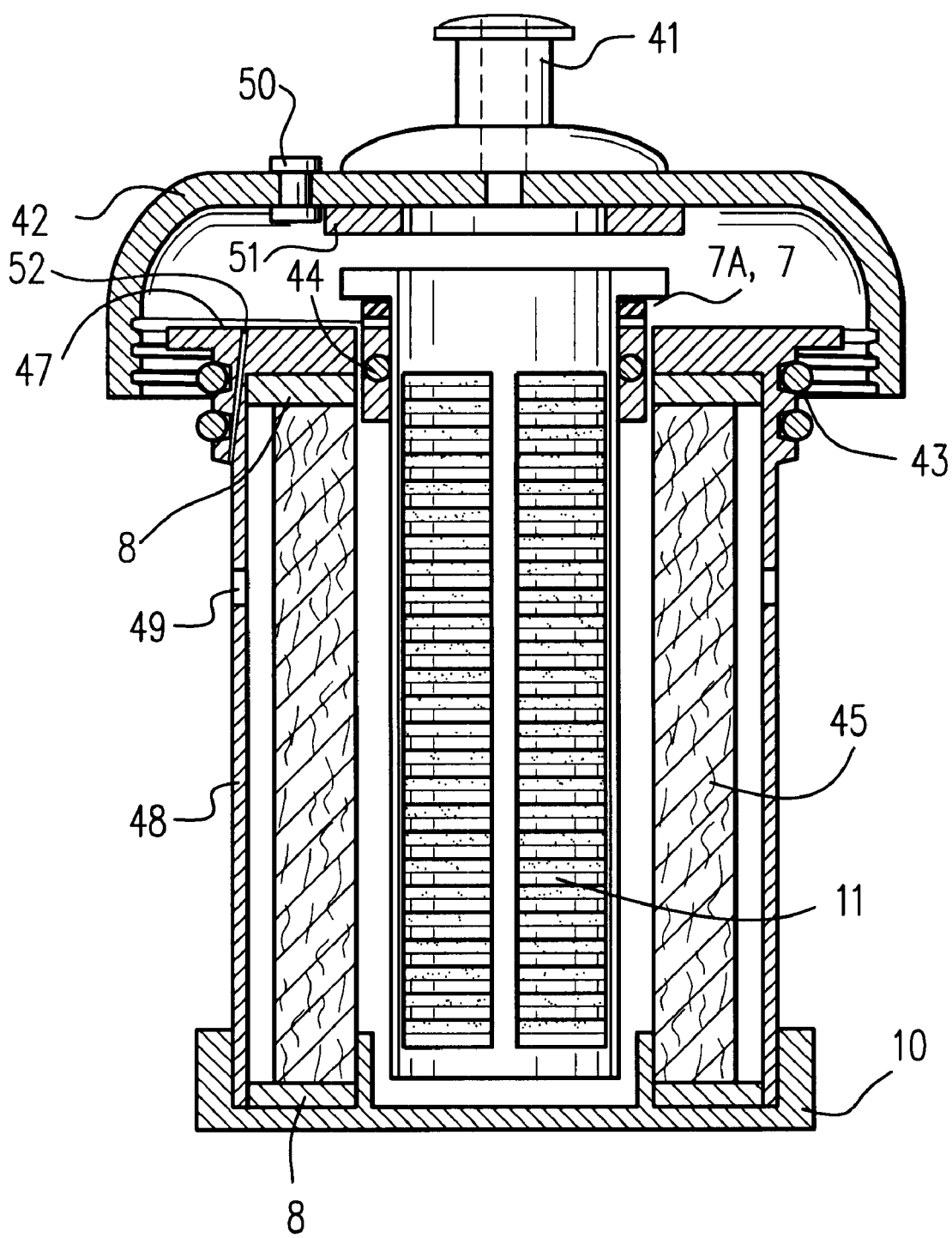

FIG. 8 illustrates a different type of product; one to treat the water for, as a minimum chlorine taste and odor by the independent external carbon composite monolithic radial flow filter 34. The interior treatment element 36 comprises an element that adds a flavoring, vitamins, minerals, and/or medications, or the like (as disclosed in WO 00/09448) to the water. The treatment element's mounting arrangement remains essentially the same. However, the outer filter element consists of a monolithic radial flow carbon composite cylinder 34, sealed at the top and bottom. An outer housing 33 is provided-for both sanitation as well as aesthetic reasons. A treated water feed chamber 38, accumulates treated water from the radial flow filter 34, and feeds the water to inlet 37. The inner flavoring element 36 comprises or consists of housing 39, with flavoring liquid (solid or granules) 40, and flavoring entry "duck billed valve" inlets 41. The mixing chamber 42 is a component of the inlet port and inlet valves for the purpose of introducing the flavoring element 40 in proportion to the water passing through the mixing and flow chamber 42. A "helix" 43 may be formed by the inner geometry to aid in the mixing of the flavor element and treated water within chamber 42.

To preclude water from remaining in contact with the flavoring inlets under static conditions, either a closing duck bill tipped valve 41 is used, or an optional water return and air relief valve, shown schematically at 44 in FIG. 8, is assembled to the sealing and mounting base outer filter adapter 10. As the flavoring liquid 40 is slowly withdrawn from the housing 39, water enters through ports 45. The water thusly entering forces the water/flavor dividing plug or seal 46 down, as does the atmosphere differential. Thus, the forming of a vacuum by the gradual outflow of the flavoring liquid 40 is avoided. As there is a difference in specific gravity between the water and flavoring (or like treatment) liquid 40, which is heavier, there is little concern for seepage past the plug or seal 46.

The bottle 14 typically has a neck between 35 mm and 73 mm, and is of ½ liter to 1 ½ liter in volume, to which may be fastened one, two, or more independent filter, or water treatment elements.

The monolithic carbon composite filter may remove >90%–80% of chlorine present under NSF protocol at a flow rate of 10 ml/sec, and may also remove >90% of lead present under NSF protocol at a flow rate of 10 ml/sec. The system may also or alternatively include an external axial flow filter incorporating iodinated resin such as a Triiosyn compound produced by Hydro Biotech, or other biocidal compound within the outer filter annulus. The iodinated resin filter is designed to devitalize most bacteria and virus within a ten second residence time while functioning as a contact biocide. The micro-fiber component of the inner filter (where provided) typically has a pore size of 1.5–3 microns or less and acts as a barrier filter to biological contaminants such as Giardia Iambli and Cryptosporium parvum, e.g. removing at least 99.95% of each. When affixed to the bottle top a dual biological seal is effected. The raw water enters the filter through ports positioned in the outer filter housing wall at the top, treated water from the biocidal filter exits at the base of the filter and flows into a thin reservoir area allowing radial flow through the inner filter element. Media retaining porous pre-filter and post filter material such as a formed disc of non-woven material may be used. The system may also utilize a third element comprising or consisting of a fiber or porous plastic pre-filter to remove excessive turbidity, when necessary. This outer pre-filter assembly mounts to the outer diameter of the mounting adapter of the second filter, and is typically a friction fit.

The chilling element 21, when utilized, reduces the temperature of the water from 15 degrees to not less than 5 degrees below ambient for a period of at least 60 to 180 minutes. The water cooling or chilling element 21 in the general shape of the above noted outer filters which mounts to the bottle top in the same manner as the other outer elements and may be used independently, without the inner filter, to cool milk, or other beverages which would be degraded by filtering. The inner filter may be reassembled at any time.

Figure 10A:
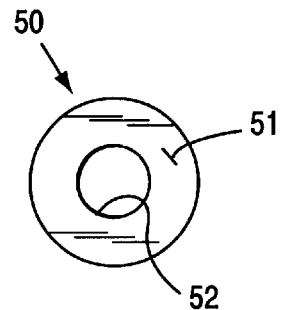
FIGS. 10a and 10b are top and side cross sectional views of a monolithic hollow center tubular element, with one closed end, for the removal of both chlorine and lead from primarily radially flowing water, utilizable in filtration assemblies according to the present invention.
Figure 10B:
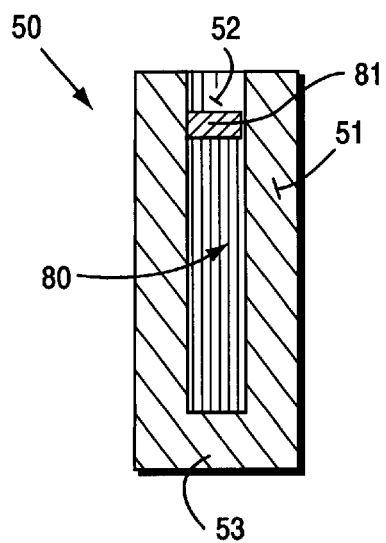

FIG. 10b also shows an optional composite portable bottle filter containing an internal hollow fiber filter bundle 80 typically of 0.1 micron pore size. Media of the type is produced by Spectrum Laboratories, and Toray in Japan, shown schematically at 80 in FIG. 10b. A seal 81 allows water to flow therethrough after passage through the hollow fibers but does not allow the bundle 80 to go out of the hollow interior of element 50.

FIGS. 10a and 10b show a composite portable bottle filter 50 element for the removal of chlorine and lead. The filter 50 is a monolithic hollow center tubular element 51 which has an open end 52, and a closed end 53, the end 53 preferably closed by the same monolithic material that forms the tube 51. The element 51 may comprise or consist essentially of activated carbon (such as coconut based activated carbon), a lead specific zeolite compound such as ATS, and an integrating polymer. For example, the activated carbon of the element 51 may comprise about 40–80% of the unit mass by weight, the ATS material about 10–40%, and integrating polymer about 10–40%. A preferred composition is about 60% activated carbon, about 20% ATS material, and about 20% integrating polymer, all uniformly distributed. In their initial pre-compound state the components of the element 51 may range from about 250 microns in size to below 37 microns, as well as a portion of fine dust. The ultimate product 51 preferably has a porosity (that is median pore size) of about 15 microns, but may be as low as about 2 and as high as about 80 microns. A pressure drop of up to 1 psi across the filter enter face is preferred at a flow rate of 10 ml/sec. The maximum pressure drop should be about 2 psi. Chlorine removal initially exceeds 90% and typically does not fall below 80% removal at 35 gallons, while initially lead removal is approximately 97% and does not fall below about 90% over 80 gallons.

Figure 11A:
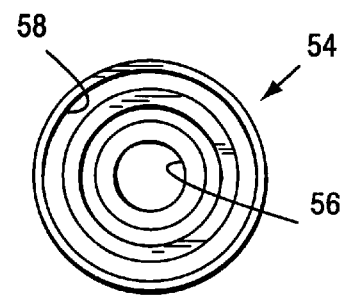
FIGS. 11a and 11b are top and side views of an exemplary outer filter housing utilizable with the monolithic element of FIGS. 10a and 10b.
Figure 11B:
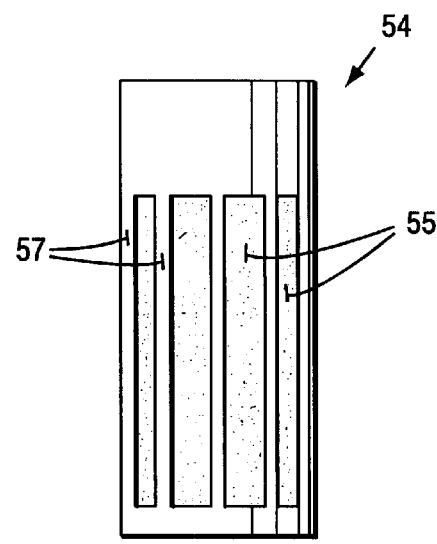

FIGS. 11a and 11b show an outer filter housing 54 which has axial and/or radial openings, such as the radial openings 55, and the axial opening 56 in the bottom thereof (see FIG. 11a), formed therein, allowing passage of water between support ribs 57 or the like. The housing 54 is preferably of an inert hard plastic. The interior opening 58 thereof is large enough to receive the element 50, and the micro-fiber sheet 60 (see FIG. 14) as will be hereinafter described.

Figure 12:
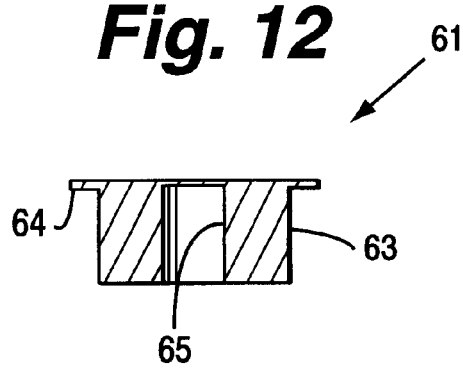
FIG. 12 is a side cross sectional view of an exemplary top closure for the outer filter assembly housing of FIGS. 11a and 11b providing a flange for bottle top mounting.
Figure 13:
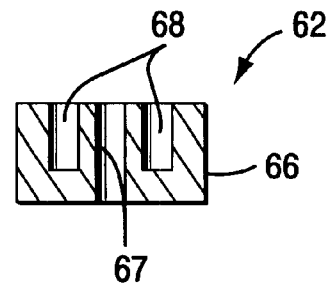
FIG. 13 is a view like that of FIG. 12 only for an internal filter housing closure for mounting to a bottle top or for receipt of a straw.

The open top of the element 54 may be closed by either one of the elements 61 or 62 of FIGS. 12 and 13, respectively. The element 61 includes a body having an outer circumference 63 that is substantially the same as the inner circumference 58 of the open top of the housing 54 so that a tight, solid, fit is provided between the elements 61 and the housing 54. The element 61 has a flange 64 which may rest on the top of the neck of a bottle (14) while the interior passageway 65 allows liquid to flow from the interior 52 of the element 50 out through the passageway 1B in the valve 2.

The element 62 has an outer circumferential portion 66 of approximately the same diameter as the open end 58 of housing 54, and has an inner opening 67 which may receive a straw, and a ring shaped opening 68 which may receive an interior mounted ring, such as the ring 5A of FIG. 1.

Figure 14:
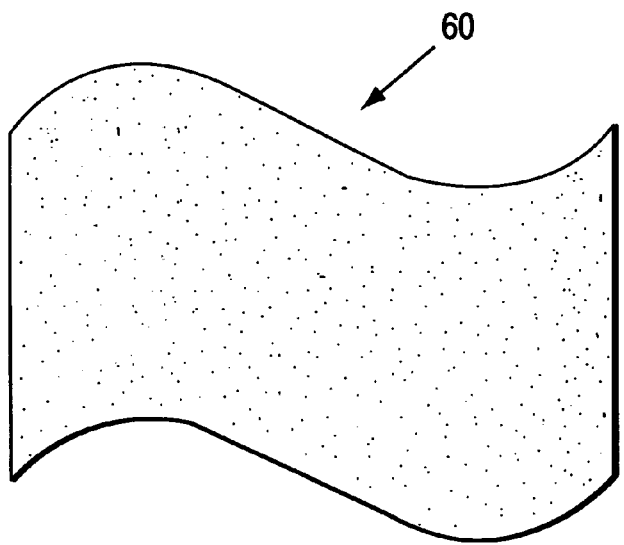
FIG. 14 is a perspective view of an exemplary micro-fiber sheet that can be cylindrically formed and molded into the outer housing of FIGS. 11a and 11b to surround the unitary element of FIGS. 10a and 10b.

FIG. 14 shows a micro-fiber sheet 60 that maybe used as a protozoa filter according to the invention. The micro-fiber sheet 60 typically has a pore size of about 1–4 microns, and may be of a material such as Pall Versa Pore 3000 W/WA. The sheet 60 may be wrapped around the circumference of the element 50 and then placed in the housing 54, the element 60 being visible between the ribs 57 of the housing 54 in FIG. 15. Alternatively, the sheet 60 may be wrapped as either a single or double layer around the element 50 and bonded closed along this seam and potted top and bottom to effect a seal.

Figure 15:
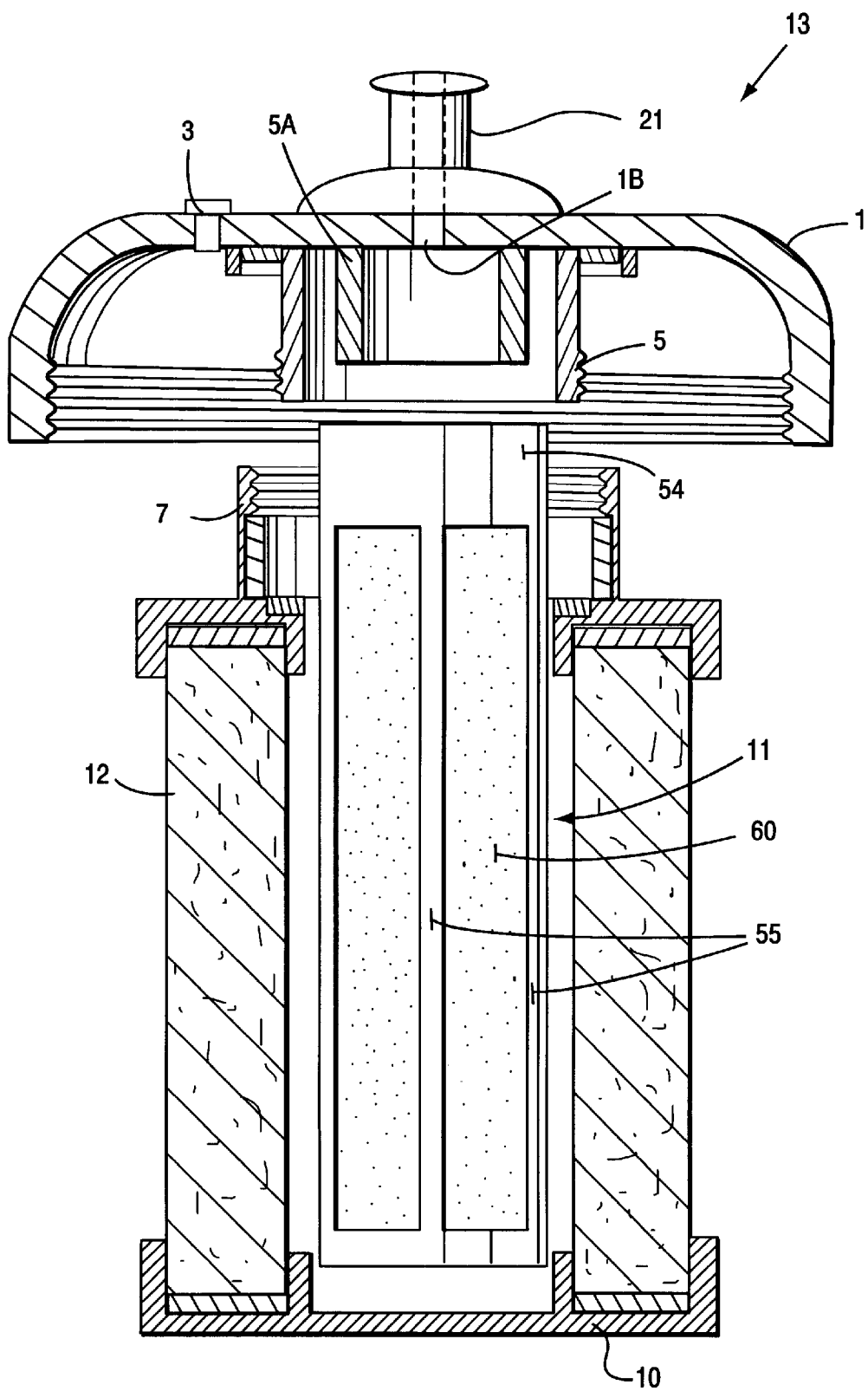
FIGS. 15 and 16 are exploded views of other embodiments of exemplary filter assemblies according to the invention.

FIG. 15 shows a filter assembly 13 very similar to that seen in FIG. 1, with like components shown by the same reference numerals, only utilizing the housing 54 with the micro pore sheet 60 wrapped around the element 50 as the inner filter element 11. The outer filter 12 may be a pleated micro-fiber sheet such as Lydall No. 9390 manufactured by The Lydall Technical Paper Co. to provide enhanced life and/or contamination removal, or it could be any one of the earlier described filtration media such as ceramic, biocidal, nitrate removal, calcium removal, etc.

Figure 16:
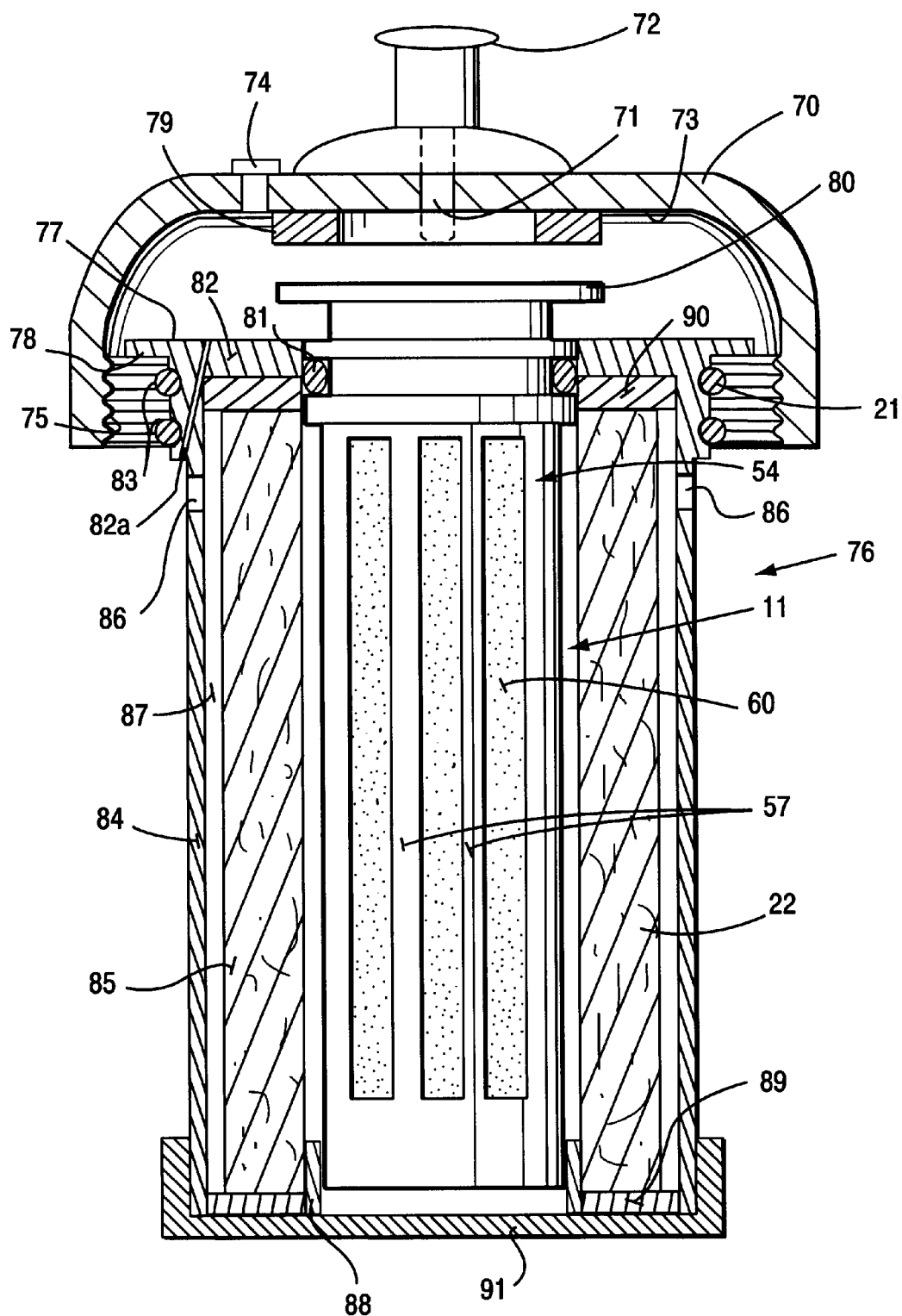

The embodiment of FIG. 16 is an embodiment that is used for mounting on the upper end of the neck of a bottle, such as bottle 14 in FIG. 1. In this embodiment the cap 70 has an internal passageway 71 which cooperates with the conventional manual valve 72 so that liquid may pass from filter 11 through the seal 79 of the cap 70 through the valve 72 to be dispensed. An optional unidirectional air relief valve 74 may be provided in the cap 70, and internal threads 75 for cooperation with appropriate external threads formed on the bottle neck. An air relief passage 82A, which may be unidirectional is placed into mounting top 82.

The filter assembly 76 includes a top mounting flange 77 having a peripheral portion 78 which rests on the top of the bottle when the threads 75 of the cap 70 engage cooperating threads of the bottle 14. In this position the flexible sealing element 79 mounted on the inner surface 73 of the cap 70 makes a water-tight seal with the upstanding hollow central portion 80 of the filter assembly 76. The element 80 is attached to the housing 54 in any suitable manner so that it is liquid tight (e.g. by ultrasonic welding, screw threading, etc.) and preferably an O-ring 81 is provided for cooperating with the mounting structure 82 for the filter element 76. The mounting structure 82 may (optionally) have a pair of O-ring water-tight seals 83 which engage the inner portion of the bottle 14 at the neck thereof.

In this embodiment an outer substantially water impervious tube 84 is provided surrounding the outer filter element 85 with opening 86 allowing entry of water into the interior chamber 87 for passage through the outer filter element 85, and then passage into operative association with the inner filter element 11 having the individual elements 50, 60, 54 as described above with respect to FIGS. 10a, 10b, 11a, 11b, and 14.

A bottom mounting structure 91 is preferably provided having an internal ring 88 which receives the bottom of the housing 84, and a potting compound 89 or the like for connection to the outer filter element 85. A similar potting compound 90 may be provided at the top of the element 85 for connection to the mounting top 82. The outer filter element 85 may comprise any of the filter elements earlier described, such as a ceramic filter, nitrate filter, biological filter, etc.

Figure 17:
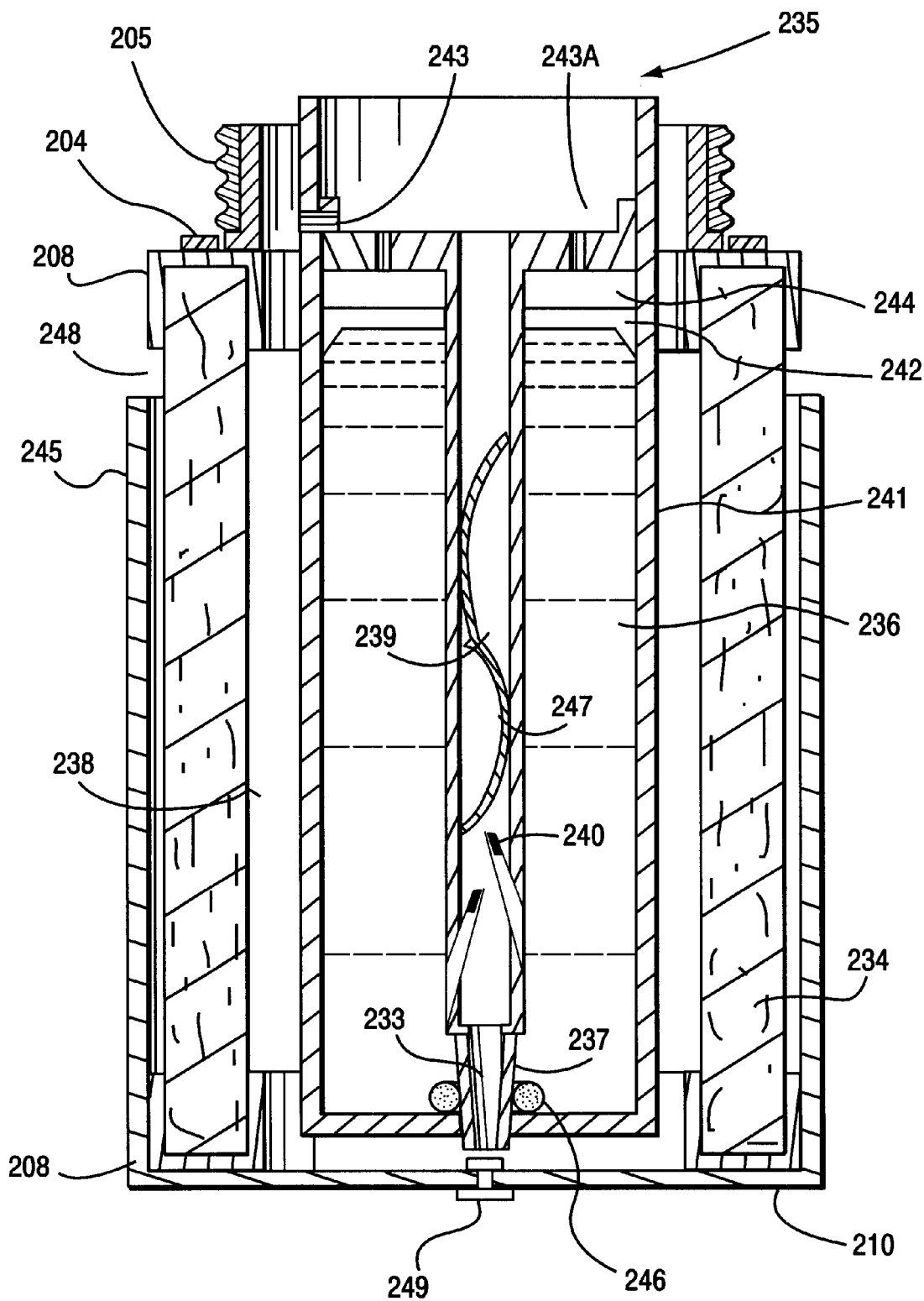
FIG. 17 is a view like that of FIG. 8 only for a modified form.

The embodiment of FIG. 17 is a modification of the FIG. 8 embodiment, and is constructed to treat the water for, as a minimum chlorine, taste and odor by the independent external carbon composite monolithic outer radial flow filter. The interior treatment element adds a flavoring (mineral, vitamin, etc.) element to the water. The treatment elements mounting arrangement remains essentially the same. However, the outer filter element consists of a monolithic radial flow carbon composite cylinder 234, assembled to a threaded adapter 205, and mounting base 210 affixed at the top and bottom by sealing and potting compound 208. An outer shroud 245 is provided for both sanitation as well as aesthetic reasons. The flavor filter element 235 nests to an inner cylindrical mounting boss molded into the top of a 53 to 63 mm cap. Similarly the outer filter element 234, combined with the outer cover-shroud 245 mounts over the flavor filter element 235 and threads to an outer second filter-mounting mount 205.

The flavor filter and element 235 consists of or comprises an outer housing 241 which mounts a separate inner housing and helical mixing element 247.

The liquid flavor and extract 236, which could also be in fine powder form, is contained between the inner and outer housings and is dispensed into the treated water flow through "duck bill valved" flavor inlets 240 which preclude the dilution of the liquid extract within the reservoir by the ingestion of water during the container breathing or inflation cycle. The liquid flavor and extract 236 is pressurized, e.g. by the pressure piston 242 which, in turn, is gradually pushed downward by the water entering inlet number 243 and exerting pressure by means of water inlets 243a. The shape and construction of the piston is such that upon release of positive downward pressure there is a slight recovery generating a negative pressure closing the duck bill inlets 240. In function, the water is pressurized and/or drawn from the bottle through the outer filter element 234 into the treated water chamber 238. The treated water enters the flavoring filter element 235 at the entry port 233 and is drawn or pressurized through the mixing and flow chamber 239. As the water passes through the mixing and flow chamber 239, the flavoring extract 236 is metered through the flavoring inlets 240. An optional shroud, or cover, 245 is shown for the purpose of protecting the independent outer filter element 234 and to provide a raw water inlet 248 which allows the user to evacuate almost all of the water from the bottle or container. An optional air relief check valve 249 may be used.

The inner housing 247 is a separate element from the outer housing 241 and pressure piston 242 to permit the inner housing 247, with the base pointed up, to be only partially assembled with the piston 242 into the outer housing 241 to permit filling of the reservoir containing the liquid flavoring extract 236. After filling, the inner housing 247 is fully inserted into place forming a seal and friction fit with the outer housing 241 and the auxiliary seals 246 precluding leakage.

Figure 18:
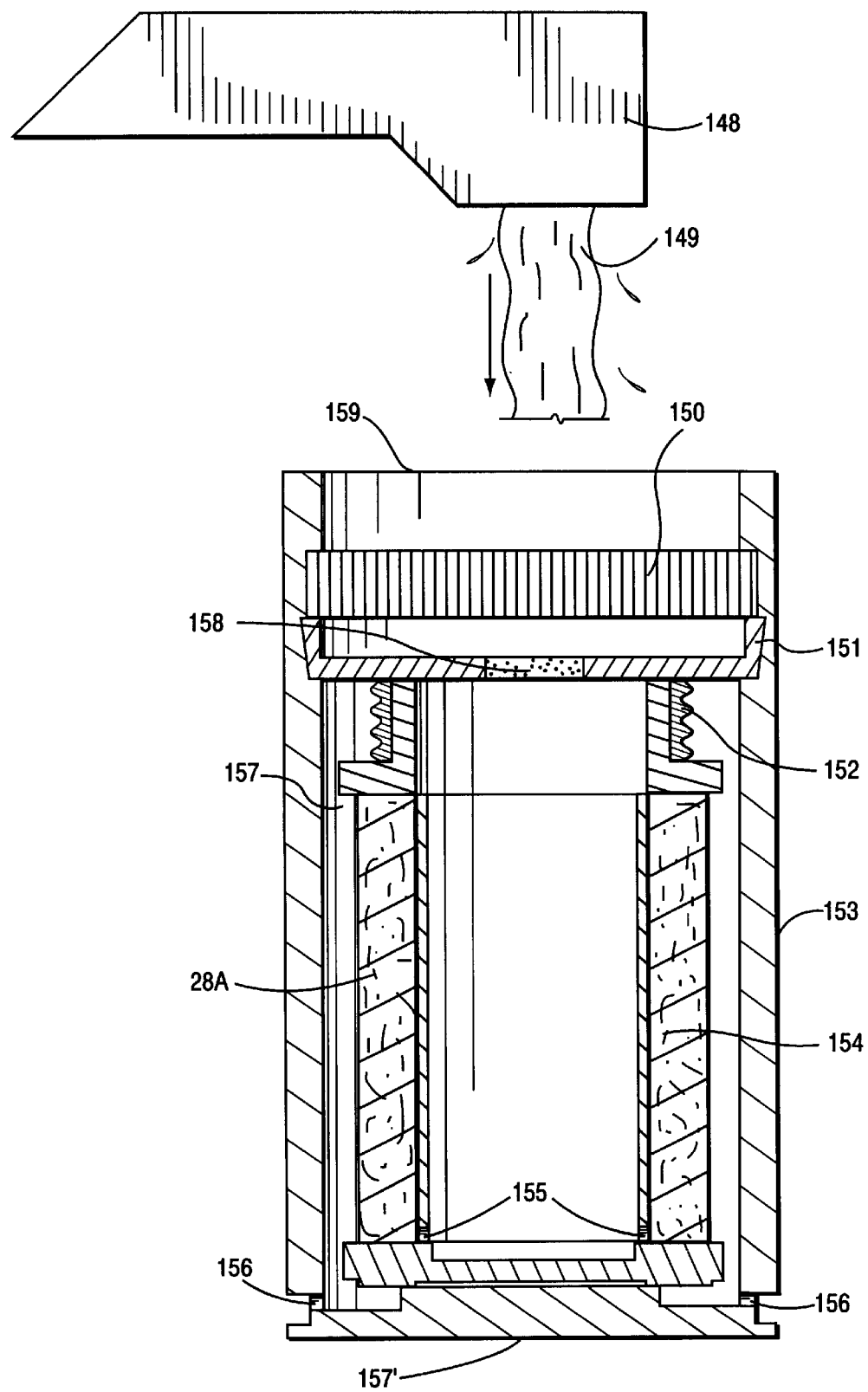
FIG. 18 is a schematic cross-sectional view of apparatus for regenerating a nitrate filter according to the invention.

FIG. 18 shows an exemplary fixture for regeneration of the nitrate removal media 28A of FIG. 6. As the nitrate specific ion exchange media 28A has relatively low capacity, compared to the nitrate contaminated water that the filtration unit may be subjected to, in many instances it may be necessary to regenerate the nitrate specific resin as frequently as on a daily basis. Hence, the relatively simple regeneration fixture of FIG. 18 has been developed which permits the regeneration of the nitrate filter over a period of several hours under a gravity mode. The same type of device, if sealed at the input side, could be pressurized to effect a more rapid generation.

In the gravity flow concept, the outer regeneration fixture 153, has the nitrate filter housing 154 placed inside, and the salt/brine cup 15 is placed into the fixture over the nitrate filter element contained in the housing 154. "The nitrate filter element in housing 154 is a slightly modified version of element 29 in FIG. 6 but the element 29 also could be used". The salt brine cup 151 contains a porous brine support element 158 through which the brine flows into "the open center of the housing body 154 of the nitrate filter [154]". A water diffuser/salt retainer 150 is placed over the salt brine cup 151 after the brine cup has been filled to the specified level with salt. The purpose of the water diffuser/salt retainer 150 is two-fold; the first, to diffuse the flow of water over the entire area of the brine cup to provide reasonably equal water flow through the entire salt matrix to optimize production of the brine. The second purpose of the water diffuser/salt retainer is to retain the salt within the brine cup and not have it splashed up and lost or displaced by the water entering the fixture.

The water 149 is released, typically, from a faucet 148 with the flow regulated by the user to just reaching the point of overflow over the open end of the regeneration fixture 159. The brine, which may be approximately 5–15% by weight salt, passes through the porous-brine support 158 and fills the chamber of the nitrate housing and enters the nitrate ion exchange resin 28A, contained within the housing, at the regeneration entry ports 155. The brine, hence, flows axially up through the ion exchange media 28A, exiting at exit ports 157 and out of the fixture at ports 156 at closed end 157.

The amount of salt contained within the brine cup 151 is calculated to permit the regeneration of the ion exchange resin contained within the nitrate filter housing 154. Subsequently, the flow of fresh water continues through the filter after the salt has been dissolved, thus flushing the residue from the ion exchange resin contained within the nitrate filter housing 154. The filter media 28A is now regenerated and may be removed from the fixture 159 and reassembled for use in a companion consumer personal water filter bottle (as in FIG. 6), or a similar device.

For all of the ranges given in the application, all smaller ranges within the broad range are provided. For example, and example only, for the time period of 60 to 180 minutes means 70 to 170 minutes, 70 to 90 minutes, 90 to 180 minutes, and all other smaller ranges within the broad range. All of the numerical values given are also approximate. For example, a pressure drop of 1 psi is "about" 1 psi, that is there may be a minor deviation therefrom. Also, in the flow rate given of 10 milliliters per second, a range of flow rates is also provided. For example, the flow rate may be between about 5–15 milliliters per second, preferably about 10 milliliters per second, although if a faster flow rate is practical and economical that would be provided too.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices and methods. The invention is to be accorded the broadest interpretation possible consistent with the prior art.

What is claimed is:

1. A bottle mountable filtration system comprising:
   a cap dimensioned to fit on and close a neck or open end of a bottle, said cap having substantially opposite first and second surfaces;
   a manual valve extending outwardly from said first surface;
   a screw threaded tubular element extending outwardly from said second surface and substantially concentric with said manual valve;
   a passageway substantially concentric with said tubular element extending through said second surface to said valve to allow liquid to flow to said valve;
   a plurality of different filter elements or filter and treating elements having different liquid filtering or treating functions;
   a water filter or treating assembly having a liquid filtering or treating function and comprising at least two of said plurality of different filter elements or filter and treating elements supported to have a substantially common central axis, and wherein at least one of the at least two different filter elements or filter and treating elements is interchangeable with others of said plurality of different filter elements or filter and treating elements to change said liquid filtering or treating function; and
   a first mounting structure connected to said water filter or treating assembly having screw threads compatible with screw threads of said threaded tubular element, and when connected to said tubular element positioning said water filter or treating assembly so that liquid flows primarily radially to said central axis through said two different filter elements or filter and treating elements to said passageway.

2. A system as recited in claim 1 wherein said tubular element is exteriorly threaded and said mounting structure is interiorly threaded.

3. A system as recited in claim 2 further comprising an unthreaded tube substantially concentric with said tubular element and surrounded thereby; and a second mounting element connected to one of said filter or treating elements and cooperable with said unthreaded tube.

4. A system as recited in claim 3 further comprising a vent in said cap, and in combination with a squeezable plastic bottle in which said water filter or treating assembly is disposed.

5. A system as recited in claim 1 wherein said plurality of different filter elements or filter and treating elements comprise a chlorine removal primarily radial flow outer filter element and an inner treatment element comprising a flavoring, vitamin, mineral, or medication adding component.

6. A system as recited in claim 5 further comprising a mixing chamber operatively mounted to said treatment element to mix at least one flavoring, vitamin, mineral, or medication with water treated by said outer filter.

7. A system as recited in claim 6 wherein said mixing chamber is an axial flow chamber radially surrounded by said flavoring, vitamin, mineral, or medication adding component, and further comprising a moving plug which prevents formation of a detrimental vacuum as said flavoring, vitamin, mineral, or medical component is consumed.

8. A system as recited in claim 1 wherein said plurality of different filter elements or filter and treating elements comprise an exterior water cooling gel, and an inner primarily radial flow carbon block filter element.

9. A system as recited in claim 8 wherein said gel includes an expansion absorber therein at top and bottom portions of said exterior water cooling gel.

10. A system as recited in claim 1 wherein said water filter or treating assembly consists essentially of two different filter elements.

11. A bottle mountable filtration system comprising:
    a cap dimensioned to fit on and close a neck or open end of a bottle, said cap having substantially opposite first and second surfaces;
    a manual valve extending outwardly from said first surface;
    a screw threaded tubular element extending outwardly from said second surface and substantially concentric with said manual valve;
    a passageway substantially concentric with said tubular element extending through said second surface to said valve to allow liquid to flow to said valve;
    a water filter or treating assembly comprising a plurality of different filter elements or filter and treating elements having a substantially common central axis, said plurality of different filter elements or filter and treating elements comprise two different filter elements or filter and treating elements; and
    a first mounting structure connected to said water filter or treating assembly having screw threads compatible with screw threads of said threaded tubular element, and when connected to said tubular element positioning said water filter or treating assembly so that liquid flows primarily radially to said central axis through said two different filter elements or filter and treating elements to said passageway, and wherein said two different filter or treating elements comprise a combined chlorine removal element and a lead removal element, capable of removing at least 90% of lead and at least 80% of chlorine in tap water filtered thereby during a useful life of at least 35 gallons, and a flow rate of about 10 ml/sec.

12. A system as recited in claim 11 wherein said chlorine removal element comprises a carbon block element that is at least about 30% carbon by weight.

13. A system as recited in claim 11 wherein said combined element has a hollow interior; and further comprising a plurality of hollow micro porous fibers within said hollow interior.

14. A bottle mountable filtration system comprising:

a cap dimensioned to fit on and close a neck or open end of a bottle, said cap having substantially opposite first and second surfaces;

a manual valve extending outwardly from said first surface;

a screw threaded tubular element extending outwardly from said second surface and substantially concentric with said manual valve;

a passageway substantially concentric with said tubular element extending through said second surface to said valve to allow liquid to flow to said valve;

a water filter or treating assembly comprising a plurality of different filter elements or filter and treating elements having a substantially common central axis; and a first mounting structure connected to said water filter or treating assembly having screw threads compatible with screw threads of said threaded tubular element, and when connected to said tubular element positioning said water filter or treating assembly so that liquid flows primarily radially to said central axis through said plurality of different filter elements or filter and treating elements to said passageway, and a first annular gasket mounted to said second surface of said cap and positioned to engage and form a seal with said first mounting structure.

15. A system as recited in claim 14 further comprising a second annular gasket mounted in said first mounting structure and positioned to make a seal with said screw threaded tubular element when said screw threaded tubular element and said first mounting structure are screwed together.

16. A bottle mountable filtration system comprising:

a cap dimensioned to fit on and close a neck or open end of a bottle, said cap having substantially opposite first and second surfaces;

a manual valve extending outwardly from said first surface;

a screw threaded tubular element extending outwardly from said second surface and substantially concentric with said manual valve;

a passageway substantially concentric with said tubular element extending through said second surface to said valve to allow liquid to flow to said valve, a water filter or treating assembly comprising a plurality of different filter elements or filter and treating elements having a substantially common central axis; and a first mounting structure connected to said water filter or treating assembly having screw threads compatible with screw threads of said threaded tubular element, and when connected to said tubular element positioning said water filter or treating assembly so that liquid flows primarily radially to said central axis through said, plurality of different filter elements or filter and treating elements to said passageway, and wherein said plurality of filter or treating elements comprise a first centrally positioned filter element comprising a carbon block element surrounded by a liquid pervious housing with a micro fiber sheet having a porosity of about 1–4 microns fixed to said housing and operatively engaging said carbon block element.

17. A bottle mountable filtration system comprising:

a cap dimensioned to fit on and close a neck or open end of a bottle, said cap having substantially opposite first and second surfaces, a manual valve extending outwardly from said first surface;

a screw threaded tubular element extending outwardly from said second surface and substantially concentric with said manual valve;

a passageway substantially concentric with said tubular element extending through said second surface to said valve to allow liquid to flow to said valve;

a water filter or treating assembly comprising a plurality of different filter elements or filter and treating elements having a substantially common central axis; and a first mounting structure connected to said water filter or treating assembly having screw threads compatible with screw threads of said threaded tubular element, and when connected to said tubular element positioning said water filter or treating assembly so that liquid flows primarily radially to said central axis through said plurality of different filter elements or filter and treating elements to said passageway, and a liquid impervious common bottom for said plurality of different filter elements or filter and treating elements.

18. A bottle mountable filtration system comprising:

a cap dimensioned to fit on and close a neck or open end of a bottle, said cap having substantially opposite first and second surfaces;

a manual valve extending outwardly from said first surface;

a screw threaded tubular element extending outwardly from said second surface and substantially concentric with said manual valve;

a passageway substantially concentric with said tubular element extending through said second surface to said valve to allow liquid to flow to said valve;

a water filter or treating assembly having a liquid filtering or treating function and comprising a plurality of different filter elements or filter and treating elements having different liquid filtering or treating functions, wherein said plurality of different filter elements or filter and treating elements comprise two different filter elements or filter and treating elements supported to have a substantially common central axis, and wherein at least one of the two different filter elements or filter and treating elements is interchangeable with others of said plurality of different filter elements or filter and treating elements to change said liquid filtering or treating function, and a first mounting structure connected to a first of said two different filter elements or filter and treating elements and having an exterior surface making a friction fit with an inner surface of said tubular element; and a second mounting structure connected to a second of said two different filter elements or filter and treating elements and having an interior surface making a friction fit with an outer surface of said tubular element.

19. A system as recited in claim 18 wherein said plurality of different filter elements or filter and treating elements comprise a carbon block primarily radial flow outer filter element and an inner treatment element comprising a flavoring, vitamin, mineral, or medication adding component.

20. A system as recited in claim 18 wherein said plurality of different filter elements or filter and treating comprise an exterior water cooling gel, and an inner primarily radial flow carbon block filter element.

21. A system as recited in claim 18 wherein said plurality of different filter elements or filter and treatment elements consist essentially of two different filter elements; and one of said two different filter elements is selected from the group consisting essentially of ceramic having a median pore diameter of less than one micron, nitrate specific ion exchange media, resin with a preference for calcium and magnesium carbonate, iodinated resin for biological devitalization, and lead removal media.

22. A bottle mountable filtration system comprising:

a cap dimensioned to fit on and close a neck or open end of a bottle, said cap having substantially opposite first and second surfaces;

a manual valve extending outwardly from said first surface;

a tubular element extending outwardly from said second surface and substantially concentric with said manual valve;

a passageway substantially concentric with said tubular element extending through said second surface to said valve to allow liquid to flow to said valve;

a water filter or treating assembly comprising a plurality of different filter elements or filter and treating elements having a substantially common central axis;

a first mounting structure connected to a first of said filter or treating elements and having an exterior surface making a friction fit with an inner surface of said tubular element;

a second mounting structure connected to a second of said filter or treating elements and having an interior surface making a friction fit with an outer surface of said tubular element; and at least one O-ring sealing between said second mounting structure interior surface and tubular element outer surface.

23. A bottle mountable filtration system comprising:

a cap dimensioned to fit on and close a neck or open end of a bottle, said cap having substantially opposite first and second surfaces;

a manual valve extending outwardly from said first surface;

a screw threaded tubular element extending outwardly from said second surface and substantially concentric with said manual valve;

a passageway substantially concentric with said tubular element extending through said second surface to said valve to allow liquid to flow to said valve; p1 a water filter or treating assembly comprising a plurality of different filter elements or filter and treating elements having a substantially common central axis;

a first mounting structure connected to a first of said plurality of different filter elements or filter and treating elements and having an exterior surface making a friction fit with an inner surface of said tubular element; and a second mounting structure connected to a second of said plurality of different filter elements or filter and treating elements and having an interior surface making a friction fit with an outer surface of said tubular element, and wherein said plurality of different filter elements or filter and treating elements comprise a first centrally positioned filter element comprising a carbon block element surrounded by a liquid pervious housing with a micro fiber sheet having a porosity of about 1–4 microns fixed to said housing and operatively engaging said carbon block element.

* * * * *